(No Model.) 6 Sheets—Sheet 2.

W. RUMBLE.
MACHINE FOR MAKING WOOD SCREWS.

No. 283,420. Patented Aug. 21, 1883.

Witnesses:
W. J. Lederle
Frank Liardo

Inventor:
Wm Rumble

(No Model.) 6 Sheets—Sheet 3.

W. RUMBLE.
MACHINE FOR MAKING WOOD SCREWS.

No. 283,420. Patented Aug. 21, 1883.

Witnesses:

Inventor:
Wm Rumble (No Model.) 6 Sheets—Sheet 4.

W. RUMBLE.
MACHINE FOR MAKING WOOD SCREWS.

No. 283,420. Patented Aug. 21, 1883.

Witnesses.

Inventor (No Model.) 6 Sheets—Sheet 5.

W. RUMBLE.
MACHINE FOR MAKING WOOD SCREWS.

No. 283,420. Patented Aug. 21, 1883.

Witnesses: Inventor:

(No Model.) 6 Sheets—Sheet 6.

W. RUMBLE.
MACHINE FOR MAKING WOOD SCREWS.

No. 283,420. Patented Aug. 21, 1883.

Witnesses:
C. Rumble
H. Rumble

Inventor:
Wm Rumble

UNITED STATES PATENT OFFICE.

WILLIAM RUMBLE, OF NEW YORK, N. Y., ASSIGNOR TO WALLACE C. ANDREWS AND WILLIAM P. SHINN, BOTH OF SAME PLACE.

MACHINE FOR MAKING WOOD-SCREWS.

SPECIFICATION forming part of Letters Patent No. 283,420, dated August 21, 1883.

Application filed December 23, 1881. (No model.)

*To all whom it may concern:*

Be it known that I, WILLIAM RUMBLE, of the city, county, and State of New York, a citizen of the United States, have invented a new and useful Machine for Making Wood-Screws, of which the following is a correct description or specification.

The machine is of that class of screw-machines in which the thread of the screw is formed by rolling pressure.

In the accompanying drawings, Fig. 5 is an elevation.

The letters of reference are the same in all the figures of the drawings.

Figure 15:
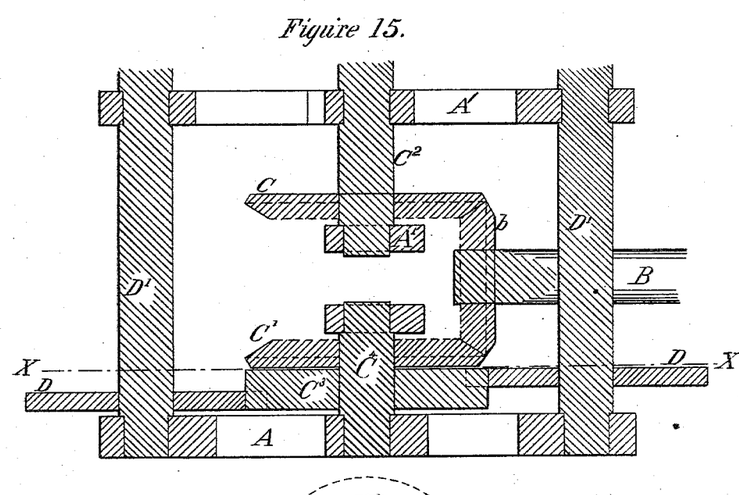
Fig. 15 is a vertical section of the gearing which drives the threading-rolls.
Figure 16:
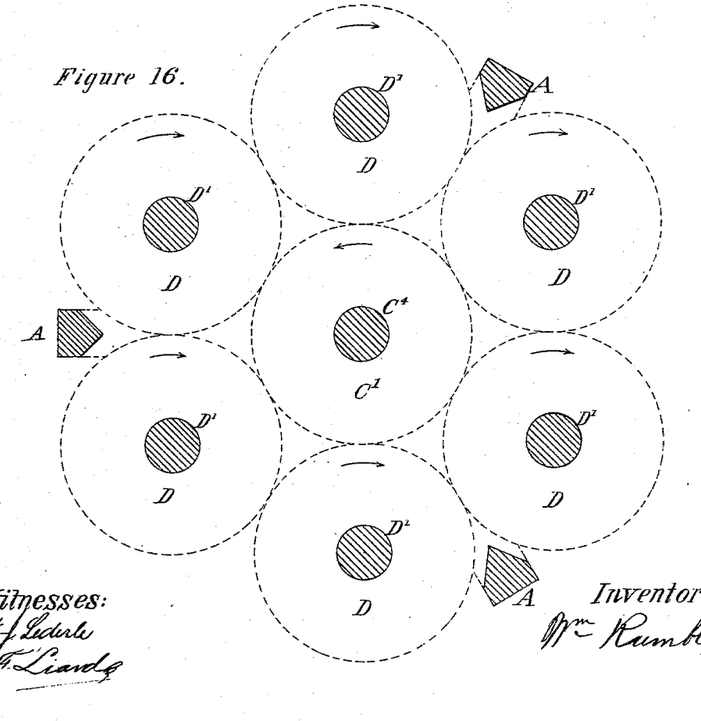
Fig. 16 is a horizontal section on the line $x\ x$ in Fig. 15, showing the pitch-lines of the teeth by dotted lines.

A refers to the frame. B is the main driving-shaft, which carries directly the cam Q, the bevel-gear wheel $b'$, and the bevel-gear wheel $b$, which gears with and imparts motion to the bevel-gear wheels C and C'. The bevel-gear wheel C is mounted on the central spindle, $C^2$, which has its lower bearing in a part of the frame A', and bears and carries with it the central threading-roll, E'. The bevel-gear wheel C' is mounted on a central spindle, $C^4$, (shown clearly in Fig. 15,) which is in a line with and below the spindle $C^2$. On the spindle $C^4$ is mounted the gear-wheel $C^3$, which it carries, and which gears with and drives the six gear-wheels, D, which are mounted on the spindles D'. The spindles D' bear the primary threading-rolls E, the point-threading rolls F F', &c., and the cams G. The gear-wheel $C^3$ is more than twice the width of the gear-wheel D. Each alternate wheel D is placed lower than the others, and revolves below them, because if the wheels D were all in the same plane they would clash with each other. The bevel-gear wheels C and C' are driven by the bevel-gear $b$ in opposite directions. The motion of gear C' is reversed in the gears D, so that they rotate in the same direction with the bevel-gear C, and the spindles $C^2$ and D' all rotate in the same direction, bearing with them the threading-rolls E' and E, all rotating in the same direction, so that the periphery of the roll E' travels in an opposite direction to the peripheries of the rolls E at the places of their nearest approach, which are at the chucks $i$; and a screw-blank standing in the chuck $i$, between and in contact with the rolls E' and E, is made by them to revolve on its axis. So, also, the peripheries of the rolls F F', &c., at the places of their nearest approach, which are at the holders $f^2$, travel in opposite directions, and cause the blank or screw in the holder $f^2$, the point being between the point-threading rolls F F', &c., and in contact with them, to rotate on its axis.

The primary threading-rolls E and E' are all alike in form and dimensions, and have formed on their faces or peripheries the thread which is to be impressed into the screw-blanks. The threads are all alike and of uniform pitch, and run from the bottom to the top in the direction of the motion. The spiral form of the rolls is clearly shown in Fig. 17, but the difference in the radius, being in fact but a small amount, is shown in exaggerated proportion in the figure. There is a notch, $e'$, in the face of the roll E', and a notch, $e^2$, in each of the rolls E. At that side of the notch which is last at the chuck $i$, in the direction of the motion, is the smallest radius of the roll, and the radius increases in passing around the roll until, arriving at the notch, the increase is equal in amount to the depth of the thread. The thread may be cut to the full depth all around the roll, or it may be run out to nothing at the place of the least radius.

Figure 3:
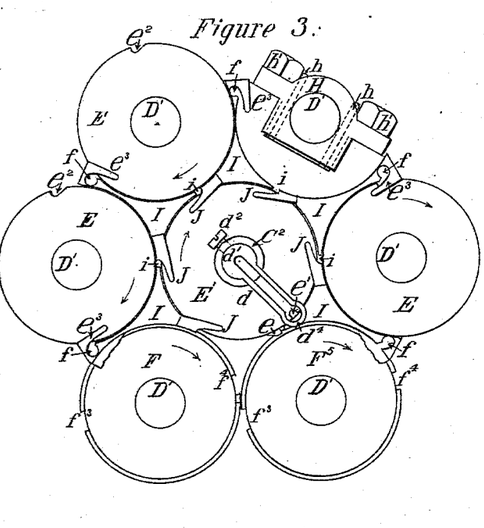
Fig. 3 is a top view of the threading-rolls, with the shaving mechanism and three of the primary threading-rolls removed and part of the frame broken away, so as to show the point-threading rolls, which lie directly beneath the primary rolls, said figure also showing one of the adjustable boxes in which the spindles of the rolls revolve.
Figure 4:
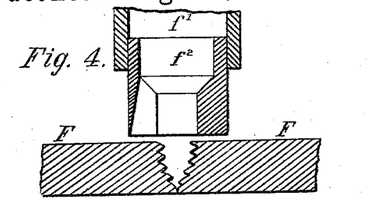
Fig. 4 shows the holder in which the blank revolves while the point is being threaded.
Figure 5:
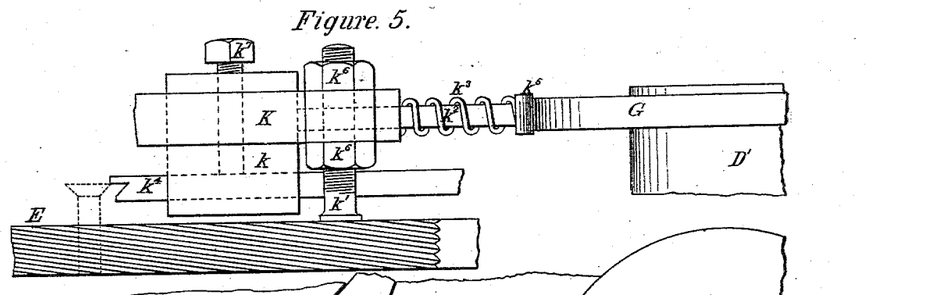
Figure 6:
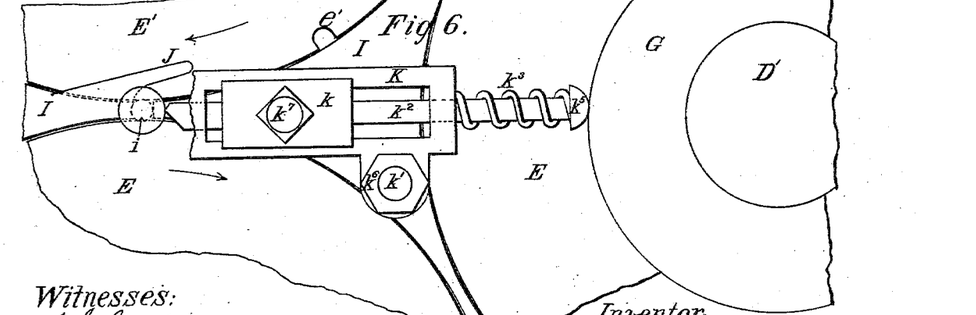
Fig. 6 is a plan of the mechanism for turning the heads.
Figure 7:
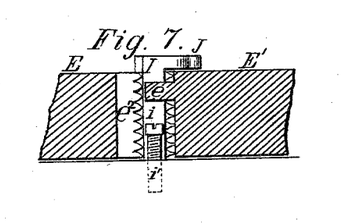
Fig. 7 is a section through the edges of the primary rolls, showing the means for removing the screw.

The boxes or bearings H, in which the spindles D' revolve, are adjustable by means of the screws $h$ and $h'$, Fig. 3, so that the distance between the central roll, E', and the rolls E may be regulated as required.

Figures 18, 19:
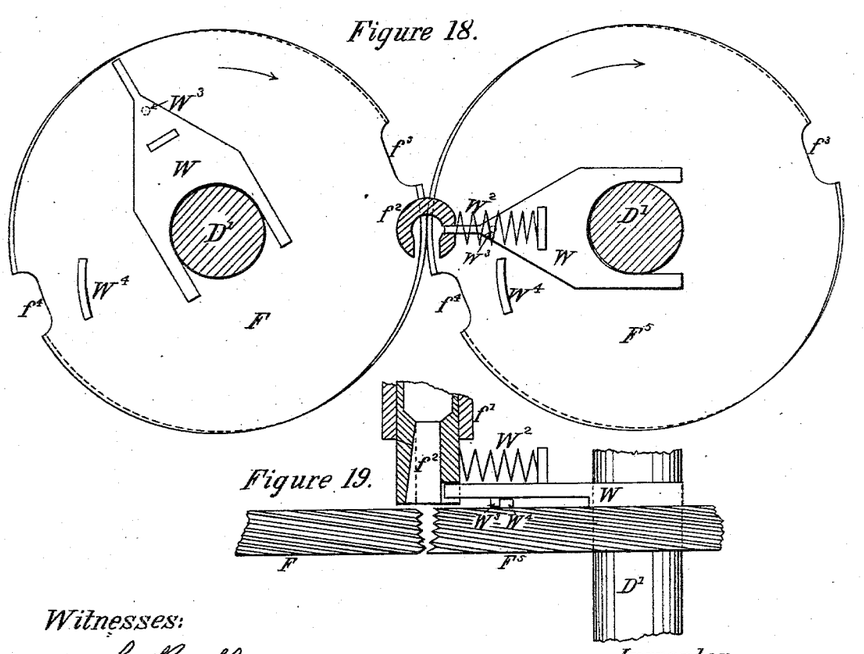
Fig. 18 is a plan of two point-threading rolls, showing the method of removing the screw.
Fig. 19 is a side view of the point-threading rolls and the slide-bar which helps in removing the screw.

The point-threading rolls F are formed in two integral sections. The upper part, wide enough to bear two full threads similar and equal to the threads of the primary-rolls, where the thread is full, is cylindrical, and the threads are of full depth all round. The cylinder has the same radius as the largest part of the primary threading-rolls. The lower part of the roll is conical and of unequal radius. The form of the face is such that the space inclosed by the two rolls, where the screw is placed between them, is of the form of the point of the screw. The periphery of the roll is divided into two equal parts by the notches $f^3$ and $f^4$, (see Fig. 18,) and the peripheries of both parts are alike, increasing in radius in regular proportion from notch to notch, the increase being equal in amount to the depth of the thread, and the larger part following the smaller as the wheel rotates past a given point. The threads on the conical part are in continuation of those on the cylindrical part, and are of the same pitch. The notches $f^3$ and $f^4$ are for the purpose of allowing the points of the blanks to drop between the rolls when they are placed in position for being pointed, and for removing them when finished, and the rolls are so mounted in relation to each other that as they rotate the notch in one roll will be opposite the notch in the contiguous roll at the holder $f^2$, thus forming a space beneath the holder into which the point of the screw will drop. The primary roll E' and the guide $d$ deliver six blanks into the chucks to each revolution of the roll E', being one to each sixty degrees of the circumference; and as the pointing-rolls F F', &c., rotate in the same time as the roll E', it follows that one blank will be delivered to the pointing-rolls to each sixty degrees of their rotation. After the first blank is deposited in the holder $f^2$ between the rolls $F^5$ and F, the roll F rotates sixty degrees, when the second blank is dropped between the rolls F and F', and when the roll F' has thereafter rotated sixty degrees the third blank is dropped between the rolls F' and $F^2$, and so on through the complete rotation, each successive blank being dropped into the space between each two succeeding rolls, going forward in the direction of the motion of the central roll, E'. The rolls F are so mounted in relation to the rolls E that when the blank is dropped into the tube $f'$ the notches $f^3$ and $f^4$ will be beneath the holder to receive the point.

To assist in the removal of the finished screw by the notches a slide-bar, W, (see Figs. 18 and 19,) is placed above each of the rolls F F', &c. One end of the bar is divided and forms a yoke which incloses the spindle D'. The other end of the bar is fitted to and placed in a slot in the side of the holder $f^2$, and it is thus held in its place, with freedom to move back and forth in the line from the spindle to the holder. The end of the bar passes through the side of the holder and nearly in contact with the point of the screw, with the other end in contact with the spindle, in which position it is held by the spring $W^2$. Projecting from the lower side of the bar is a pin, $W^3$, and on the face or side of the roll is projection $W^4$, eccentric with the spindle, so that it will impinge against the pin $W^3$, and thus move the bar W against the point of the screw in the holder and carry the screw over, so that the notch in only one of the rolls (that notch which is moving outward from the center of the machine) will come in contact with the screw and draw it out of the holder and throw it out of the machine.

In the triangular spaces between each three adjacent primary threading-rolls are the chuck-blocks I, firmly secured to the frame of the machine, the tops being flush and even with the tops of the rolls. Sufficient space is allowed between the chuck-blocks and the rolls, so that there shall be no contact between them. In the spaces between the ends of two adjacent chuck-blocks, adjacent to the roll E', and between the rolls E and E', are the chucks in which the blank is placed while being threaded and turned, the width of the chuck between the chuck-blocks being such that the blank is held loosely in an upright position, and the space between the rolls E and E' is so regulated by the adjusting-screws $h$ and $h'$ that the blank will be tightly pinched between the rolls as soon as they begin to rotate after the blank is placed. The depth of the chuck is regulated by the screw $i'$, which is set in a vertical position in the bottom of the chuck, and is screwed up or down to suit the length of the blank.

Attached to the top of the chuck-block, on that side of the chuck which is last reached by a point in the periphery of the roll E' as it rotates, is a hook, $j$, the point of which projects over the roll E' and reaches backward in the direction of the motion, and so that the point will be at a sufficient distance from the faces of the chuck-blocks to inclose a blank loosely between them. The heel of the hook is a continuation upward of the side of the chuck.

In the outer end of the chuck-block is a tubular opening, $f$, down which a blank may pass, terminating in the holder $f'$, at a point directly above the space between the point-threading rods F F', &c., and in a line between their centers. Into the lower part of the holder $f'$ is a holder, $f^2$, which is adjustable vertically, being held in $f'$ by a set-screw or otherwise. The holder $f^2$ is so formed that the screw hangs by its head, and it is open on the side opposite the center of the machine, so that a screw may pass out of it sidewise, and is so enlarged at the bottom, on the side opposite the slide-bar W, that the point of the blank may be moved in that direction.

Attached to the top of the chuck-block, at its outer end, is a hook, $e^3$, which projects over the roll E, and is similar in shape and function to the hook $j$. The heel of this hook is a continuation of the side of the tube $f$.

Inserted in each of the chuck-blocks I is a stud, $k'$, the upper part of which is threaded and has two nuts, $k^6$. These studs and nuts support the ways or guides K, on which are mounted the tool-holders $k$ to hold the cutting-tools which turn the tops of the screws. Each tool-holder has a stem, $k^2$, projecting through a suitable opening in the guide K. The end $k^5$ of the stem is held in contact with the periphery of the cam G, and by the action of the cam the tool-holder is moved forward and the tool brought to bear on the head of the blank held and rotated in the chuck $i$.

Into the periphery of the central roll, E', is inserted a wedge-shaped projection or lug, $e$, of sufficient projection to reach across the chuck $i$. The lug precedes the notch $e'$ in the direction of the motion of the roll a short distance. A groove is cut in the face of each chuck-block for the lug to move in. The lug is wedge-shaped on its forward side, so that when it encounters a blank in the chuck $i$ it will move it out into the notch $e^2$ in the side of the roll E. The rolls E are mounted in such a relative position with the roll E' that the lug $e$ will arrive at the chucks $i$ at the same time with the notches $e^2$ in the rolls E.

The hopper M may be of any of the many known forms; but that shown in the drawings is preferred. It is a pan with a slot in the bottom in which the lifter or dipper works. The dipper is operated by the cam Q by means of the pitman $q$. The cam Q is fixed to and carried by the main shaft B. On one side of the cam-wheel is a groove, $q^5$, and on the other side a groove, $q^6$, formed in the shape of two semicircles of differing diameters, and tangent to each other at $w^2$, their point of union. The difference in the diameter of the semicircles is equal to the motion required in the pitman. The semicircles forming the groove $q^5$ are the complements of those forming the groove $q^6$, the centers of the circles being on a line drawn across the disk of the cam through its center. The groove $q^5$ begins near the periphery of the wheel at $n$, and running through two half-circles terminates at $n'$ near the axis. Opposite to the termination $n'$ of groove $q^5$ the groove $q^6$ on the other side begins, and running through the half-circles terminates opposite to the beginning of $q^5$. The ends of the grooves are sloped from their bottoms to the face of the wheel, so that the friction-rollers which run in them may readily slide out at the ends.

Figures 1, 10, 11, 12:
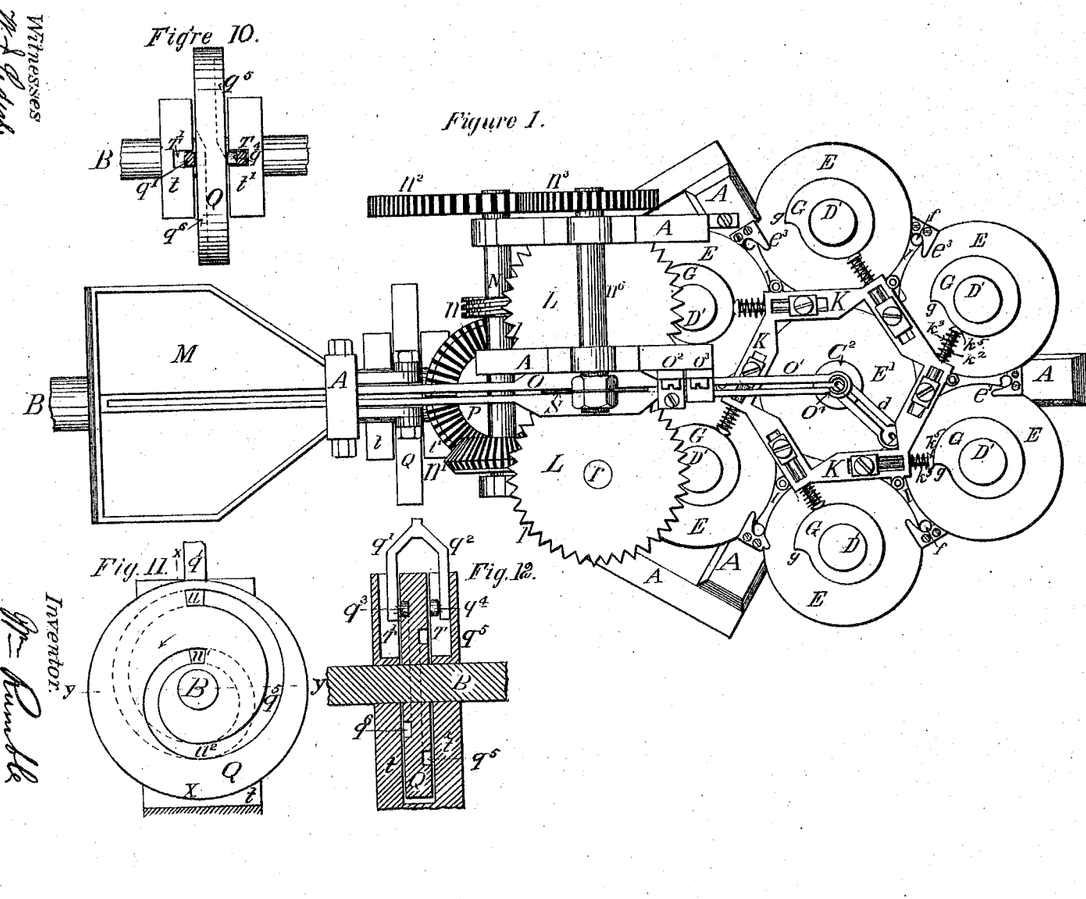
Figure 1 is a top-view of the machine.
Fig. 10 is a top view of the cam for operating the feed-dipper for the hopper.
Fig. 11 is a vertical plan view of the cam and connected parts.
Fig. 12 is a vertical section through the cam and the connected parts at right angles to the view in Fig. 11.
Figures 2, 13:
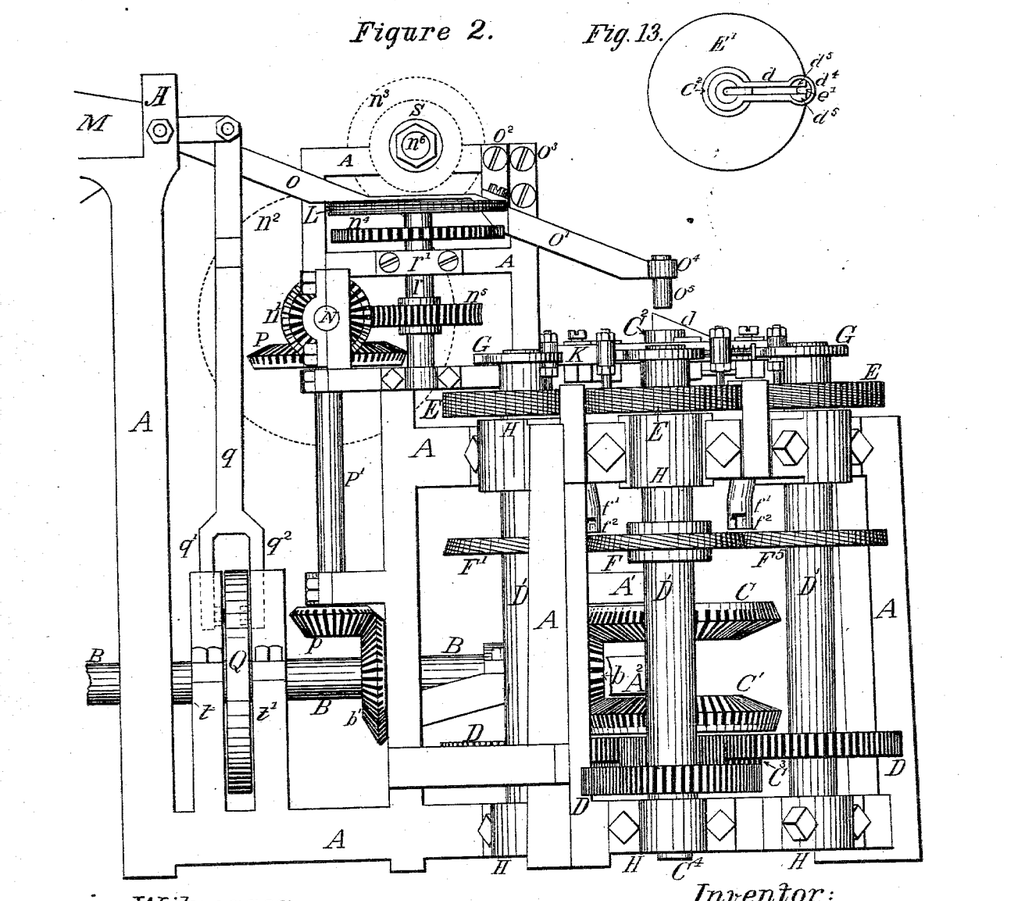
Fig. 2 is a side view or elevation.
Fig. 13 is a plan of the roll E' and the guide $d$.

On each side of the cam-wheel is a standard, $t$ and $t'$, and in the standards are recesses T and T', in a vertical line over the driving-shaft and on the sides of the standards adjacent to the cam. In the recesses the arms $q'$ and $q^2$, which are the termini of the pitman $q$, work. The recesses are of sufficient breadth at right angles to the face of the cam to allow of a motion of the arms $q'$ and $q^2$ to and from the cam. At the extremity of the arms, on the side next to the cam, are mounted friction-rollers $q^3$ and $q^4$, of a diameter and thickness to move freely in the grooves $q^5$ and $q^6$. The arms $q'$ and $q^2$ are at such a distance apart that when one of the friction-rollers is in the groove the other is out. If the roller $q^4$ is in the groove $q^5$ and the cam revolves in the direction indicated by the arrow in Fig. 11, then when the roller arrives at the end of the groove $u'$ it will be pushed out of the groove by the incline and the rotation of the cam and the roller $q^3$ will be moved into the groove $q^6$. Thus the pitman will be made to vibrate sidewise in the recesses T and T', and to move up and down, making a complete reciprocation to two turns of the driving-shaft and cam. Each of the grooves covers one entire rotation of the cam; but they may be so constructed that each groove shall cover two or more revolutions, in which case the pitman will make a complete reciprocation in four or more revolutions of the cam. When the dipper of the hopper is raised, the upper face of it, in which the blanks hang by their heads, has such an inclination that the blanks will slide down and pass onto the ways or guides O O, which lead on such an incline that the blanks will slide down by the action of gravity to the nicking-saw, and horizontally under the nicking-saw, when they are again inclined to the same pitch as above the nicking-saw, and lead to a point directly over the center of the central threading-roll, E', where they terminate in a vertical tube, O$^4$, inside of which is fitted a thimble, O$^5$, which is open at the side toward the guides, and can be adjusted vertically in the tube O$^4$. The upper portions of the guides O O are attached to the frame of the machine at the hopper and at O$^2$. The lower portion is attached to the frame by two set-screws at O$^3$, by which set-screws it may be adjusted to the desired height, and when the lower part of the guides is set lower at O$^3$ than the upper part there will be a drop at that point.

Attached to the upper end of the central spindle, $C^2$, is the guide $d$. It is so fitted to the spindle that it turns with it, but may be adjusted vertically and held in position by the set-screw $d^2$. The guide $d$ terminates in a short vertical tube, $d^4$, directly over the notch $e'$ in the side of the roll $E'$. The guide may be on an incline, so that the blanks will follow it by the force of gravity; or it may be level and the blanks made to traverse it by the centrifugal force imparted to them by the rotation of the guide as carried round by the spindle $C^2$; or they may be at such an incline that both forces will act together in carrying the blanks to the tube $d^4$. The outer side of the tube arrests the onward motion of the blank, and it drops into the notch $e'$, the head resting on the jaws $d^5$.

Figure 8:
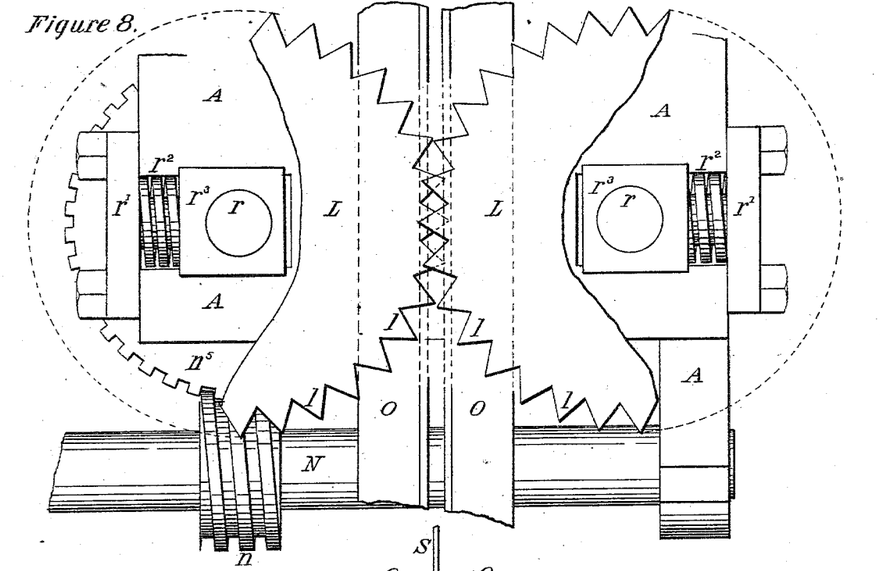
Fig. 8 is a top view of the mechanism for feeding the blanks to the nicking-saw.
Figure 9:
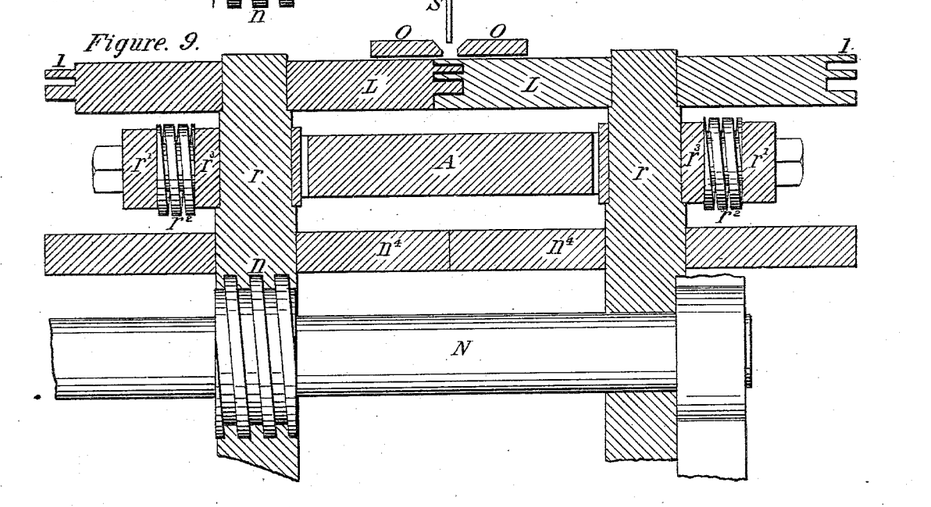
Fig. 9 is a vertical section through the center, as shown in Fig. 8, except as to the springs and driving-shaft, which are in projection.
Figure 14:
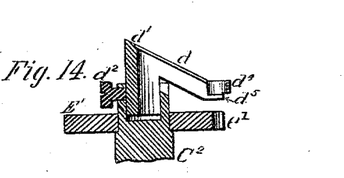
Fig. 14 is a central vertical section of parts shown on Fig. 13.

The nicking-saw S and the feed-wheels L L are driven by the gear $b'$ on the main shaft and gears $p$, P, and $n'$, mounted on the spindles or shafts P' and N. From the shaft N the saw is driven by the gears $N^2$ and $N^3$, and the feed-wheels by the worm-gear $n$ and $n^5$, and the feed-wheel shafts are geared to run together by the spur-gears $n^4 n^4$. The feed-wheels L L are so speeded that six blanks are fed to the saw during one revolution of the threading-roll $E'$. The feed-wheels rotate immediately beneath the level part of the guides O O. The pitch-lines of the teeth $l$ meet in the center of the guides. A line through the centers of the feed-wheels is at right angles to the line of the guide. The feed-wheels are so mounted that the spaces between the teeth on one wheel come opposite to the spaces between the teeth of the other, and the points of the teeth of either wheel fit into grooves in the other wheel, which grooves are cut around the wheel and divide the teeth into not less than two parts on each wheel. The spindles $r\ r$, on which the feed-wheels are mounted, rotate in the movable boxes $r^3$, and the feed-wheels are pressed toward each other by the springs $r^2 r^2$, placed between the movable boxes $r^3$ and the caps $r'$. The guides are shown by dotted lines in Fig. 8, where they pass over the feed-wheels, so that the teeth $l\ l$ of the feed-wheels may be clearly shown. The saw S rotates in a vertical plane parallel to the line of the guides O O, and immediately over their center line, and at such a height above them that it will cut the proper distance into the head of the blank, which is carried under the saw by by the feed-wheels.

The operation of the machine is as follows: The lower part of the guide O', the thimble $O^5$, the guide $d$, the screws $i'$ in the bottoms of the chucks, and the holders $f^2$, also the way or guide K, are adjusted and set at the proper height for the length of the blank to be operated upon, and the several threaded rods, E, are adjusted so as to give the proper distance between them and the central rod, $E'$. The tools for turning the heads must be properly set, and also the saw. The blanks are placed (previously headed and pointed) in the hopper M, from which they, being raised and hanging by their heads in the slot of the dipper, slide down onto the guides O O, and down the guide till they impinge against the teeth of the feed-wheels L L, which move in the same direction that the blanks are moving. Each space formed between two teeth of one wheel and two teeth of the other wheel receives one blank, which is inclosed and held tightly by the teeth of the feed-wheels, which are pressed together by the springs $r^2 r^2$, and prevented from turning while being acted on by the saw. As the feed-wheels rotate the blanks are carried under the edge of the saw and the nick is cut in them. They are still carried forward by the feed-wheels until they reach the lower incline, O', of the guides O O, down which they slide, and drop through the tube $O^4 O^5$ into the guide $d$, exactly in the center of its rotation. They then, by the force of gravity, or by their centrifugal force, or by both combined, traverse the guide $d$ and drop into the tube $d^4$ and the notch $e'$, and the shank rests between the central threading-roll, $E'$, and the chuck-block I. The blank is carried forward by the rotation of the roll $E'$ with the guide $d$, and passes between the point of the hook $j$ and the chuck-block, and as it is still carried forward it is pressed by the hook out of the notch $e'$ and into the chuck $i$. As soon as the first blank leaves the notch $e'$ another drops into it, and as the roll $E'$, with the guide $d$, continues to rotate the second blank is, in the same manner as the first, placed in the second chuck, $i$, and so, in like manner, a blank is placed in each of the six chucks at every revolution of the roll $E'$. When the blank is placed in the chuck, and as the rolls $E'$ and E rotate, it is between the rolls at that place in the periphery of each of the rolls where the radius is least, and consequently where the space between them is greatest, and the blank is slightly pressed between the rolls and caused to rotate. As the rotation of the rolls continues the space between them diminishes and the blank is more firmly held, and the thread on the rolls is thus pressed into the blank, until, with a complete revolution of the rolls, the thread is fully formed on the blank. As soon as the blank, after it is placed in the chuck, is firmly gripped by the threading-rolls, the cutter for turning the head is moved forward by the cam $g$ and pressed against the head of the blank, and by the rotation of the blank against the edge of the tool the head is turned. Before a complete rotation of the rolls is made the point $g$, which is the largest part of the cam, passes the end $k^5$ of the stem of the tool-holder, and the spring $k^3$ drives back the tool away from the blank. The screw is now as far finished as it can be in the chuck $i$, and as the notch $e^2$ in the roll E, and the lug $e$, attached to the roll $E'$, arrive simultaneously at the chuck $i$, the lug, in passing the chuck, forces the blank out of it and into the notch $e^2$, in which position it is carried between the body of the roll E and the face of the chuck-block I to the hook $e^3$, and is then, by the combined action of the rotation of the roll E and the hook $e^3$, transferred to the tube $f$, through which it passes into the holder $f^2$, and the point of it drops between two point-threading rolls, F, &c., in the space made by the notches $f^3$ and $f^4$. As the rolls F F', &c., rotate, the full threads on the cylindrical part of the rolls impinge against the threaded portion of the blank and cause it to revolve and adjust itself to the threads on the thread-pointing section. The threads on the conical part of the rolls are then by the continued rotation brought to bear on the pointed part of the blank, and it is thus threaded and the screw is finished. The gears below the threading-rolls are protected by a covering, so that the screws shall not fall into them. All the blanks lodged, as before described, in the six chucks are treated in the same manner as to threading, turning, and point-threading.

Figure 17:
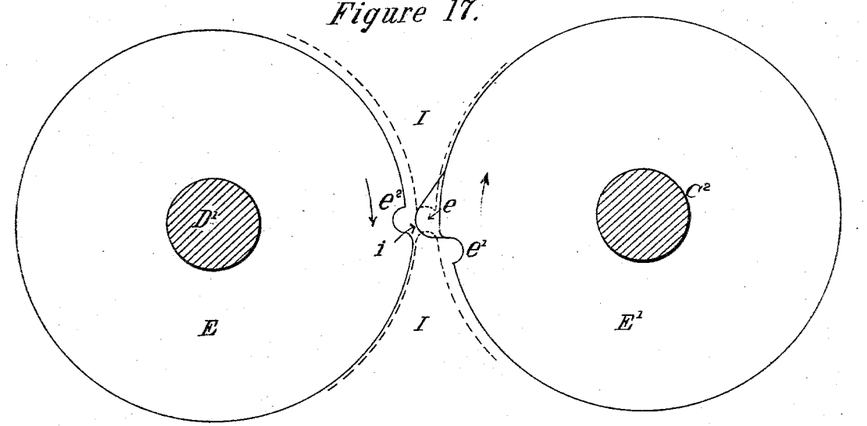
Fig. 17 is a plan of two threading-rolls, showing the method of removing the blank. The difference of radius of the rolls is somewhat exaggerated so as to show it more clearly.

On Fig. 17 the chuck-blocks I are shown by dotted lines.

The rolls F F', &c., are in two sections only, as regards form. They are, in fact, only one piece.

I claim as my invention and desire to secure by Letters Patent—

1. The combination of the cam Q, having the grooves $q^5$ and $q^6$, with the standards $t$ and $t'$, having the recesses T and T', and the pitman $q$, having the arms $q'$ $q^2$, substantially as described.

2. The combination of the toothed feeding-wheels L L, the movable bearings $r^3$, the springs $r^2$, and the saw S, with the guides O O, substantially as described.

3. The combination of the roll E', having notch $e'$, and the revolving guide $d$, substantially as shown and described.

4. The combination of the guides O O with the roll E', having notch $e'$, and the revolving guide $d$, substantially as described.

5. The combination of the revolving guide $d$ with the roll E', having the notch $e'$, the guide-blocks I I, the hook $j$, and the roll E, having the notch $e^2$, substantially as described.

6. The combination of the roll E', having the notch $e'$, with the guide-blocks I I, and the hook $j$, substantially as shown and described.

7. The combination of the roll E', having the wedge-shaped lug $e$, with the blocks I I, and the roll E, having the notch $e^2$.

8. The combination of the rolls E E' with the movable tool-holder $k$, the carriage K, the spring $k^3$, and cam G, substantially as described.

9. The combination of the roll E, having the notch $e^2$, with the guide-blocks I, and the hook $e^3$, substantially as described.

10. The combination of the roll E, having the notch $e^2$, with the guide-blocks I, the hook $e^3$, the well $f$, and the point-threading-roll F, substantially as described.

11. The combination of three or more rolls for threading screw-blanks, all of which are made to rotate in the same direction, and around one of which, as a central roll, the others are arranged, concentrically, in such a manner that screw-blanks may be placed between each of the concentric rolls and the central roll to be threaded.

12. A roll or rotating die for threading screw-blanks, the entire periphery of which is formed or described about the center on which the die rotates by a radius of constantly increasing length.

13. The combination, in a machine for threading screw-blanks, of two pairs of rolls or dies, one pair of which thread the shanks, and the other pair the points of the screws, substantially as shown and described.

WM. RUMBLE.

Witnesses:
W. J. LEDERLE,
FRANK LIARD.